US008220746B1

(12) United States Patent
Stecko et al.

(10) Patent No.: US 8,220,746 B1
(45) Date of Patent: Jul. 17, 2012

(54) BROAD SPEED RANGE INFLATABLE DROGUE CANOPY

(75) Inventors: Stephen M. Stecko, Fullerton, CA (US); John Ferencz Takacs, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 12/474,715

(22) Filed: May 29, 2009

(51) Int. Cl.
*B64D 39/00* (2006.01)

(52) U.S. Cl. .................. 244/135 A; 244/110 R; 244/152

(58) Field of Classification Search .............. 244/110 R, 244/142, 152; 141/266; 137/355.24
See application file for complete search history.

(56) References Cited

U.S. PATENT DOCUMENTS

| | | | | |
|---|---|---|---|---|
| 2,761,636 A * | 9/1956 | Finlay | ............................ | 244/113 |
| 2,946,543 A * | 7/1960 | Gordon et al. | ............. | 244/135 A |
| 2,998,949 A * | 9/1961 | Patterson | ....................... | 244/145 |
| 3,008,674 A * | 11/1961 | Abraham | ................... | 244/135 A |
| 3,011,742 A * | 12/1961 | Gross | .......................... | 244/135 A |
| 3,108,769 A * | 10/1963 | Hieber | ....................... | 244/135 A |
| 4,645,144 A * | 2/1987 | Zupanick | ....................... | 244/113 |
| 5,326,052 A * | 7/1994 | Krispin et al. | ............. | 244/135 A |
| 5,427,333 A | 6/1995 | Kirkland | | |
| 6,604,711 B1 * | 8/2003 | Stevens et al. | ............. | 244/135 A |
| 6,786,455 B1 * | 9/2004 | Bartov | ....................... | 244/135 A |
| 6,926,049 B1 * | 8/2005 | Enig et al. | ...................... | 141/387 |
| 7,219,857 B2 | 5/2007 | Takacs et al. | | |
| 2004/0050998 A1 | 3/2004 | Edwards | | |
| 2005/0087653 A1 * | 4/2005 | Koch | ............................ | 244/142 |
| 2007/0102583 A1 * | 5/2007 | Cutler et al. | ............... | 244/135 A |
| 2008/0054124 A1 * | 3/2008 | Takacs et al. | .............. | 244/135 A |

* cited by examiner

*Primary Examiner* — Timothy D Collins
*Assistant Examiner* — Joshua Huson
(74) *Attorney, Agent, or Firm* — Yee & Associates, P.C.

(57) ABSTRACT

A refueling system on an aircraft comprises a fuel hose coupled to the aircraft, a drogue coupled to the fuel hose, an air data computer, and a drogue canopy controller coupled to the drogue canopy. The drogue further comprises a coupling, a plurality of vanes, and a drogue canopy. The drogue canopy controller determines a selected surface area of the drogue canopy based on air speed. The drogue canopy controller is configured to modify a surface area of the drogue canopy to conform to the appropriate surface area.

35 Claims, 14 Drawing Sheets

BROAD SPEED RANGE INFLATABLE DROGUE CANOPY

BACKGROUND INFORMATION

1. Field

The present disclosure relates generally to aerial refueling, and in particular to drogues used in aerial refueling. Still, more particularly, the present disclosure relates a method and apparatus for aerial refueling using a drogue having a canopy capable of operating across different speeds.

2. Background

In-flight refueling is an important method for extending the range of aircraft traveling long distances over areas having no feasible landing or refueling points. In-flight refueling may also be referred to as air-to-air refueling. In-flight refueling is a relatively common operation for military aircraft. The aircraft providing the fuel is referred to as the tanker aircraft, and the aircraft receiving the fuel is referred to as the receiver aircraft.

This type of operation may require the aircraft to be refueled to be precisely positioned relative to the tanker aircraft maintain connection for transferring fuel between the receiver aircraft and the tanker aircraft. The requirement for precise relative spatial positioning of the two moving aircraft makes in-flight refueling a challenging operation.

Two primary systems are currently used for in-flight refueling. One system is a hose and drogue system. This system includes a refueling hose having a drogue located at one end. The hose and drogue are deployed and trail behind the tanker aircraft once the tanker aircraft is in position to deliver the fuel. The pilot of the receiver aircraft then flies the receiver aircraft to intercept and couple with the drogue for refueling.

Another existing system is a boom refueling system. The boom refueling system typically includes a rigid boom extending from the tanker aircraft, with a probe and nozzle at its distal end. The boom also includes airfoils controlled by a boom operator stationed on the refueling aircraft. The airfoils allow the boom operator to maneuver the boom with respect to the receiver aircraft, which flies in a fixed refueling position below and aft of the tanker aircraft.

Typically, drogue aerial refueling operations occur at airspeeds between around 105 knots to around 325 knots. Different drogues are designed to operate at different speeds in this range. Existing drogues can be classified as low speed, high speed, variable speed, or variable drag.

A typical low speed drogue operates around 105 to around 180 knots. A typical high speed drogue operates around 180 to around 325 knots. These different types of drogues operate with a fixed area drogue canopy that has a fixed projected frontal area. Variable speed and variable drag drogues are designed with fixed area canopies, but have limited ability to change the drogue's drag. In variable speed and variable drag drogues, the surface area of the canopy is fixed, but the projected frontal area is manipulated to change the speed in which the drogue may operate. These drogues have a broader speed range than typical low and high speed drogues. Still, the largest range of these may be from around 105 to around 230 knots. Since different canopies operate at different speeds, the drogue canopy for the tanker aircraft may need to be changed out from time to time based on the anticipated speed of refueling that may be used on the next refueling mission. The change requires time and may delay a refueling mission if the needed drogue canopy is not identified with sufficient time to make a change without delaying the mission.

Thus, it would be advantageous to have a method and apparatus that takes into account at least some of the issues discussed above, as well as possibly other issues.

SUMMARY

In one advantageous embodiment, an apparatus comprises a drogue structure, a drogue canopy, and a drogue canopy controller. The drogue canopy is attached to the drogue structure, wherein the drogue canopy has a surface area. The drogue canopy controller is connected to the drogue canopy and the drogue canopy controller is capable of changing the surface area of the drogue canopy.

In another advantageous embodiment, a drogue comprises a coupling, a plurality of vanes, a drogue canopy, and a drogue canopy controller. The coupling attaches the drogue to a fuel hose. The plurality of vanes is attached to the coupling. The drogue canopy is attached to the plurality of vanes. The drogue canopy controller is configured to modify a surface area of the drogue canopy.

In another advantageous embodiment, a refueling system on an aircraft comprises a fuel hose coupled to the aircraft, a drogue coupled to the fuel hose, an air data computer, and a drogue canopy controller coupled to the drogue canopy. The drogue further comprises a coupling, a plurality of vanes, and a drogue canopy. The drogue canopy controller determines a selected surface area of the drogue canopy based on air speed. The drogue canopy controller is configured to modify a surface area of the drogue canopy to conform to the selected surface area.

In yet another advantageous embodiment, a method for fuel hose positioning is shown, wherein the method comprises determining the air speed of the drogue; identifying a selected surface area of a drogue canopy based on the air speed of the drogue, wherein the selected surface area allows fuel hose positioning; and modifying a surface area of the drogue canopy to the selected surface area.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
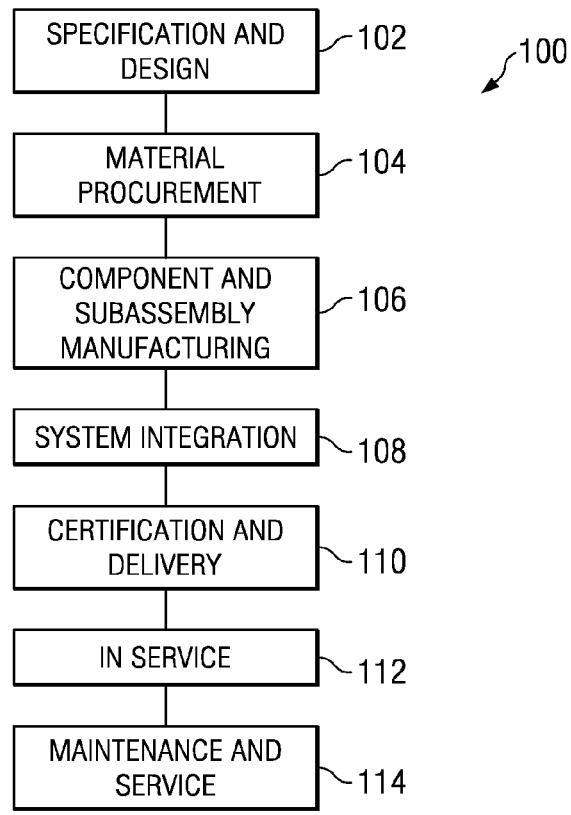
FIG. 1 is an illustration of an aircraft manufacturing and service method in accordance with an advantageous embodiment.
Figure 2:
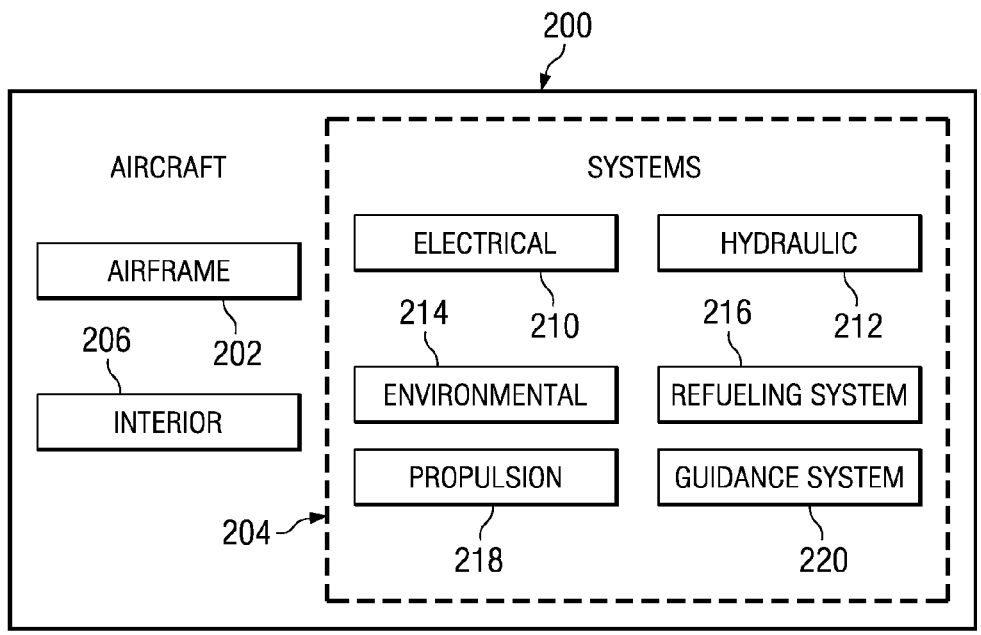
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, illustrative aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with systems 204 and interior 206. Examples of systems 204 include one or more of propulsion system 218, electrical system 210, hydraulic system 212, environmental system 214, refueling system 216, and guidance system 220. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 of FIG. 2 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As another example, one or more of the different advantageous embodiments may be used to manufacture parts for use in aircraft 200 during component and subassembly manufacturing 106 and/or maintenance and service 114.

The different advantageous embodiments recognize and take into account a number of considerations. For example, the different advantageous embodiments recognize and take into account that with current drogue configurations, time must be taken to change drogues on a tanker aircraft to refuel at different speeds.

Further, the different advantageous embodiments also recognized that a tanker aircraft can only refuel receiving aircraft that can fly at speeds for which the tanker aircraft's drogue operates. As are result, if the receiving aircraft flies at speeds different from those for the drogue, refueling may be difficult and/or impossible. As a result, depending on the receiving aircraft that will be refueled during a mission, a different drogue may be needed. Changing a drogue on a tanker aircraft takes time and increases operation and support costs. Also, in some situations, one drogue may not be able to operate at all of the speeds used by the different receiving aircraft during a mission.

Thus, the different advantageous embodiments provide a method and apparatus of refueling aircraft in the air. In one advantageous embodiment, a refueling system on an aircraft comprises a fuel hose coupled to the aircraft, a drogue coupled to the fuel hose, an air data computer, and a drogue canopy controller coupled to the drogue canopy. The drogue further comprises a coupling, a plurality of vanes, and a drogue canopy. The drogue canopy controller determines a selected surface area of the drogue canopy based on air speed. The drogue canopy controller is configured to modify a surface area of the drogue canopy to conform to the selected surface area.

Figure 3:
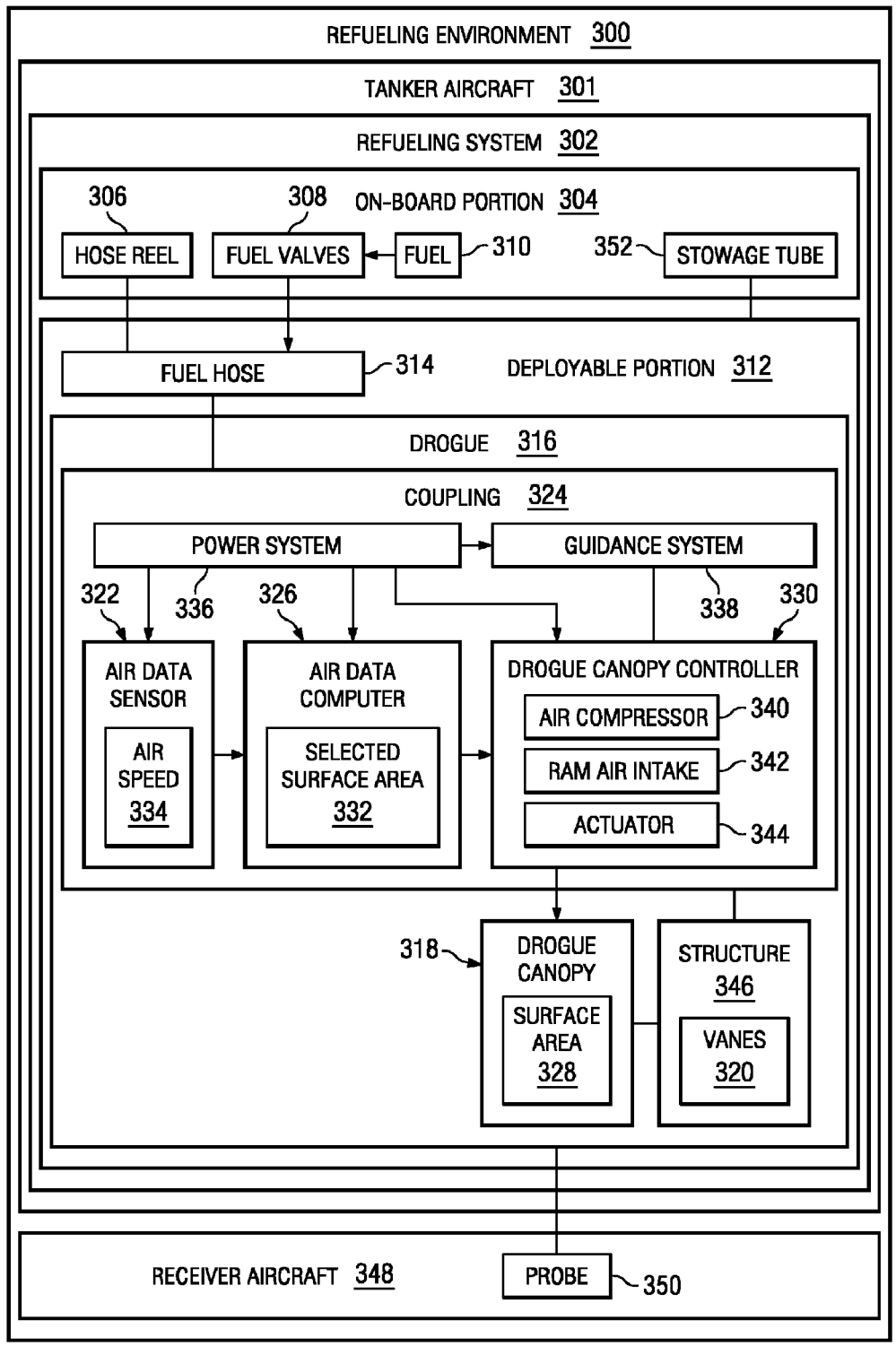
FIG. 3 is block diagram of a refueling system in accordance with an advantageous embodiment.

Turning now to FIG. 3, a block diagram of a refueling environment is depicted in accordance with an advantageous embodiment. In these examples, refueling system 302 is one example of one implementation of a refueling system such as, for example, refueling system 216 as shown in FIG. 2.

In this illustrative example, refueling environment 300 comprises tanker aircraft 301 and receiver aircraft 348. In these illustrative examples, receiver aircraft 348 comprises probe 350. Receiver aircraft 348 may couple probe 350 to coupling 324 and/or drogue 314. Probe 350 may be coupled to coupling 324 and/or drogue 314 for receiving fuel 310.

In these illustrative examples, refueling system 302 is a system in a tanker aircraft such as, for example, tanker aircraft 301. Tanker aircraft 301 is a tanker aircraft in these examples and may be similar to aircraft 200 in FIG. 2. Tanker aircraft 301 may also be implemented as tanker aircraft 302 of FIG. 3. Of course, in other advantageous embodiments, tanker aircraft 301 may be some other type of aircraft. In these illustrative examples, refueling system 302 may include an on-board portion 304 and a deployable portion 312.

On-board portion 304 comprises the components of refueling system 302 that stay on tanker aircraft 301 during a refueling process. Deployable portion 312 comprises the components of refueling system 302 that are deployed during a refueling process.

In these illustrative examples, on-board portion 304 may include hose reel 306, fuel valves 308, fuel 310, and stowage tube 352. Hose reel 306 is capable of reeling fuel hose 314, deployable portion 312, and/or drogue 316 into aircraft 301. Fuel valves 308 control the flow of fuel into fuel hose 314. Fuel 310 may be any type of fuel or consumable. Fuel 310 may consist of a gas and/or liquid. Fuel 310 may be, for example, without limitation, jet fuel, gasoline, air, oxygen, water and/or some other suitable type of component.

In these illustrative examples, deployable portion 312 may include fuel hose 314 and drogue 316. Fuel hose 314 is connected to hose reel 306 for the purposes of deploying and retracting fuel hose 314. Fuel hose 314 is connected to fuel valves 308 for receiving fuel 310. Fuel hose 314 is also connected to drogue 316 through coupling 324.

Drogue 316 includes drogue canopy 318, structure 346 and coupling 324. Coupling 324 is connected to structure 346. Structure 346 may also be referred to herein as a "drogue structure". Structure 346 may comprise vanes 320. Structure 346 may also comprise another type of structure for example, without limitation, mesh wires, mesh rope, solid metal, solid plastic, and/or any other type of item capable of connecting coupling 324 to drogue canopy 318.

Vanes 320 may be moveable and/or non-moveable. Vanes 320 are connected to drogue canopy 318. Vanes 320 may provide structure and/or support for drogue canopy 318. Vanes 320 may also provide also provide support for, but not limited to, a type of wire, cable, line, and/or tube coming from coupling 324 and going to drogue canopy 318. Vanes 320 may also provide support for a type of suspension line and/or any type of wiring that may manipulate and/or modify surface area 328 of drogue canopy 318. Vanes 320 may also be used as wires and/or be manipulated to control the shape of drogue canopy 318. Modifying is defined as adjusting, changing, and/or manipulating a drogue canopy and/or section of the drogue canopy. Modifying may be using a drogue canopy controller to change a surface area of a drogue canopy or section of the drogue canopy. Surface area 328 of drogue canopy 318 may be modified during flight. Drogue canopy 318 may be used to increase stability of drogue 316 and/or deployable portion 312 during flight and while deployed. Drogue canopy 318 may also be modified to position and/or move drogue 316 during deployment.

During a refueling process when deployable portion 312 is deployed, drogue canopy 318 interacts with the air in such a way that creates drag and causes drogue canopy 318 to trail behind aircraft 301.

Coupling 324 may include air data sensor 322, air data computer 326, drogue canopy controller 330, power system 336, and guidance system 338. Probe 350 may be inserted into coupling 324 in order to allow transferring fuel 310 from tanker aircraft 301 to receiver aircraft 348 of FIG. 3.

Air data sensor 322 identifies air speed 334 and transmits air speed 334 to air data computer 326. For example, air data sensor 322 may identify air speed by using air pressure and/or by ram air. Air data computer 326 identifies selected surface area 332 for drogue canopy 318 based on air speed 334. Air data computer 326 may be pre-programmed with different selected surface areas relating to different air speeds. Air data computer 326 may also be programmed with a formula for calculating different selected surface areas for different air speeds. Selected surface area 332 is inversely related to air speed 334. For example, as air speed 334 increases, selected surface area 332 decreases. Selected surface area 332 is identified to allow fuel hose positioning behind aircraft 301.

In the depicted examples, the desired fuel hose position and/or desired fuel hose catenary is selected to be a distance below the airstream of tanker aircraft 301 that reduces and/or minimizes wake turbulence. The desired fuel hose position and/or desired fuel hose catenary may also be extended enough to allow safe separation between tanker aircraft 301 and a receiver aircraft, such as receiver aircraft 304. Catenary is defined as the curve assumed by a cord that is perfectly flexible, but not capable of being stretched.

In these illustrative examples, drogue canopy controller 330 controls surface area 328 of drogue canopy 318. Controller 330 may control surface area 328 by, for example, without limitation, changing the shape of surface area 328, changing the size of surface area 328, and/or otherwise modifies surface area 328.

Drogue canopy controller 330 is controlled by air data computer 326. Drogue canopy controller 330 may be implemented using any device which controls surface area 328 of drogue canopy 318. For example, drogue canopy controller 330 may be air compressor 340, ram air intake 342, actuator 344 and/or some other suitable component. Actuator 344 may be, for example, without limitation, a linear actuator, a track actuator, a rotary actuator, and/or some other suitable component. An air compressor or a ram air intake is used when drogue canopy 318 is an inflatable material. The actuators are used when drogue canopy 318 is a flexible material. In some advantageous embodiments, the inflatable material and elastic material may both be made from a fiber reinforced elastomeric composite.

The illustration of refueling environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, a number of additional drogues in addition to drogue 316 may be used. A number as used herein refers to one or more items. For example, a number of additional drogues is one or more additional drogues. Power system 336 may be located with on-board portion 304. Also, for example, air data sensor 322 may be combined with air data computer 326. Guidance system 338 may be located with on-board portion 304 and/or somewhere else on tanker aircraft 301.

Figure 4:
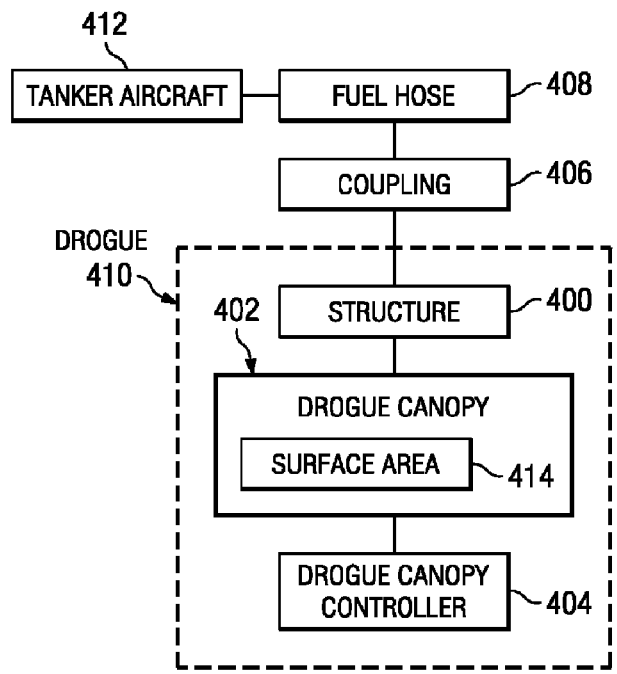
FIG. 4 is block diagram of an apparatus in accordance with an advantageous embodiment.

With reference now to FIG. 4, a block diagram of a refueling apparatus in accordance with an advantageous embodiment. In this advantageous embodiment, tanker aircraft 412 is connected to fuel hose 408. Fuel hose 408 is connected to coupling 406. Coupling 406 is connected to structure 400. Coupling 406 connects structure 400 to fuel hose 408. Structure 400 is part of drogue 410. Structure 400 may comprise a plurality of vanes. Drogue 410 also may comprise drogue canopy 402 and drogue canopy controller 404. Drogue canopy 402 comprises surface area 414. Drogue canopy controller 404 is capable of modifying surface area 414 of drogue canopy 402. Modifying surface area 414 of drogue canopy 402 changes a number of aerodynamic characteristics of drogue 410.

In this advantageous embodiment, tanker aircraft 412 is an example of one implementation of tanker aircraft 301 of FIG. 3. Fuel hose 408 is an example of one implementation of fuel hose 314 of FIG. 3. Coupling 406 is an example of one implementation of coupling 324 of FIG. 3. Structure 400 is an example of one implementation of structure 346 of FIG. 3. Drogue canopy 402 is an example of one implementation of drogue canopy 318 of FIG. 3. Drogue canopy controller 404 is an example of one implementation of drogue canopy controller 330 of FIG. 3. Drogue 410 is an example of one implementation of drogue 314 of FIG. 3.

Figure 5:
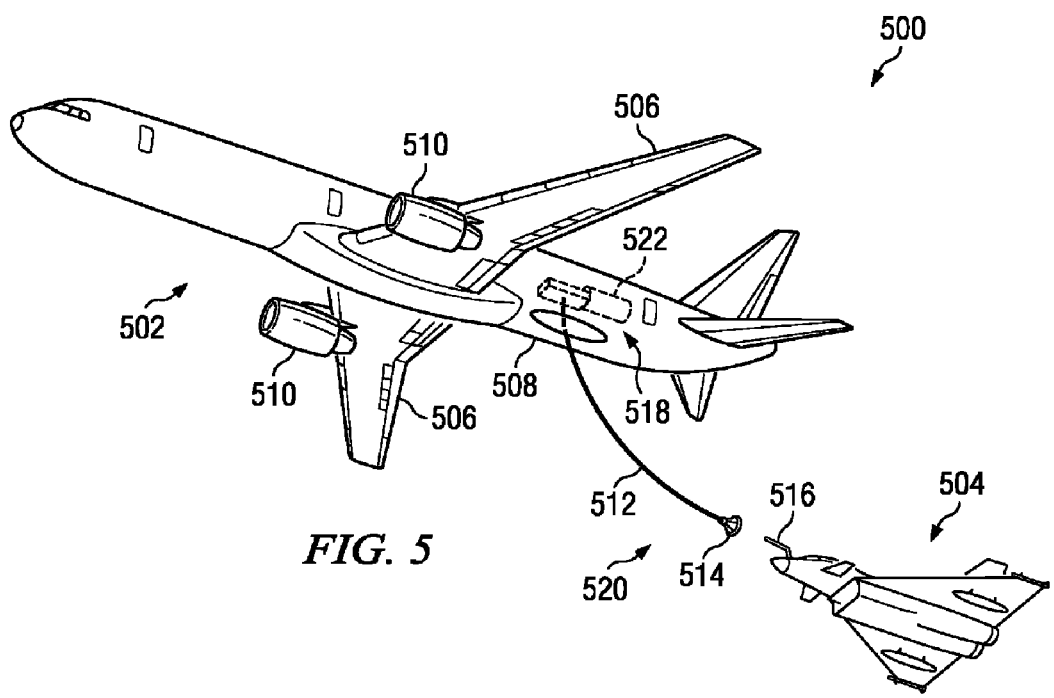
FIG. 5 is an illustration of a tanker aircraft refueling a receiver aircraft in accordance with an advantageous embodiment.

With reference now to FIG. 5, an illustration of a tanker aircraft refueling a receiver aircraft in accordance with an advantageous embodiment. In this example, refueling environment 500 is an example of one implementation of refueling environment 300 in FIG. 3. refueling environment 500 includes tanker aircraft 502 positioned to couple with and refuel receiver aircraft 504, using refueling device 520, configured in accordance with an embodiment of the invention. Tanker aircraft 502 has fuselage 508, wings 506, and engines 510. The tanker aircraft may have more than two engines as depicted in this illustrative embodiment. In other embodiments, aircraft 502 can have other configurations. In an illustrative embodiment, refueling device 518 can include on-board portion 522. On-board portion 522 may include components such as a hose reel, fuel valves, and fuel. Deployable portion 520 may include fuel hose 512 and drogue 514.

Figure 6:
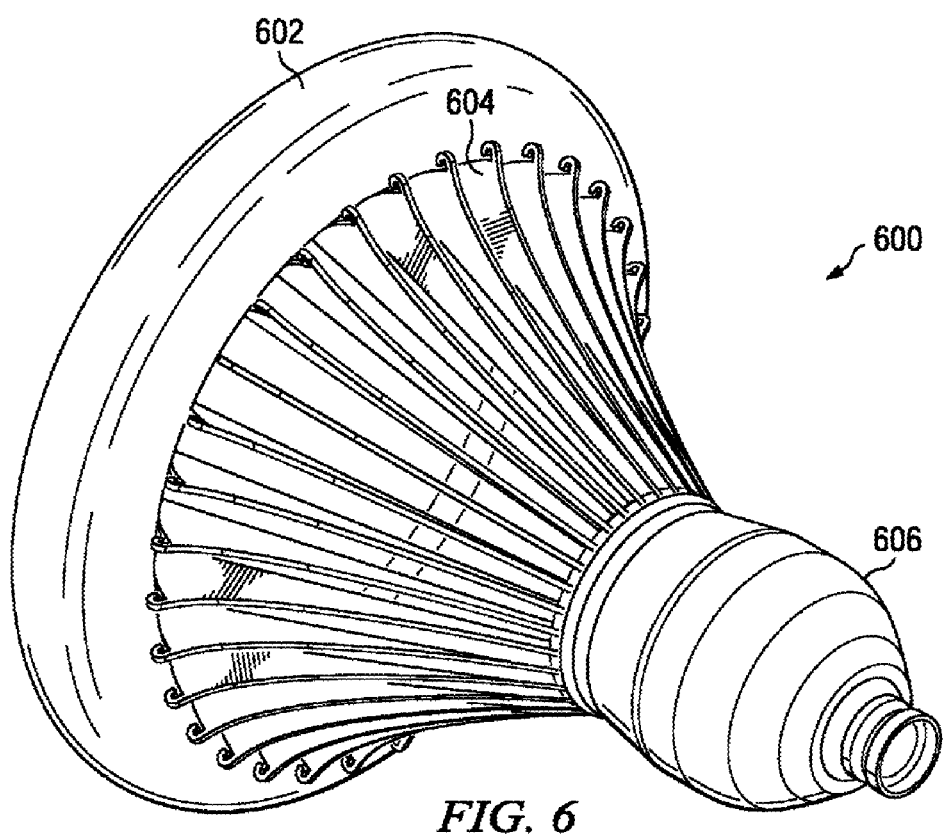
FIG. 6 is an illustration of a full toroid drogue canopy inflated to a first level of inflation in accordance with an advantageous embodiment.
Figure 7:
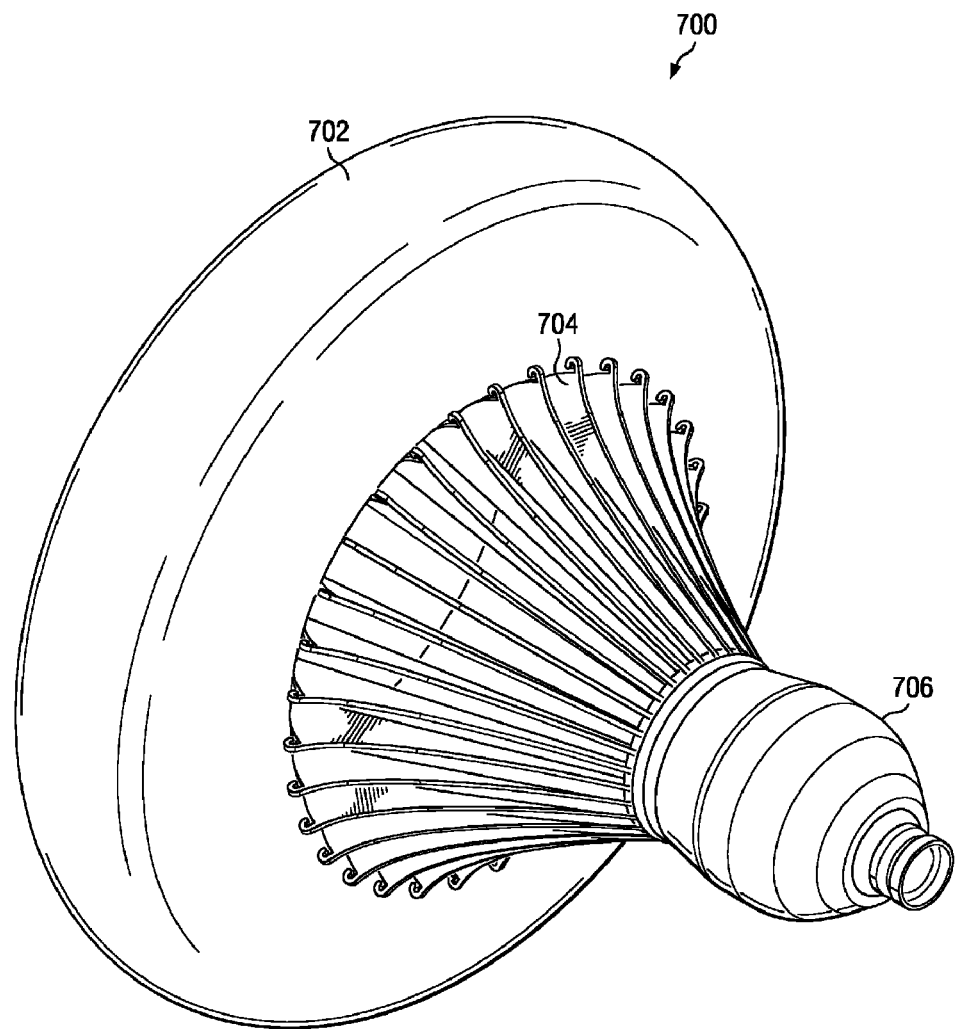
FIG. 7 is an illustration of a full toroid drogue canopy inflated to a second level of inflation in accordance with an advantageous embodiment.
Figure 8:
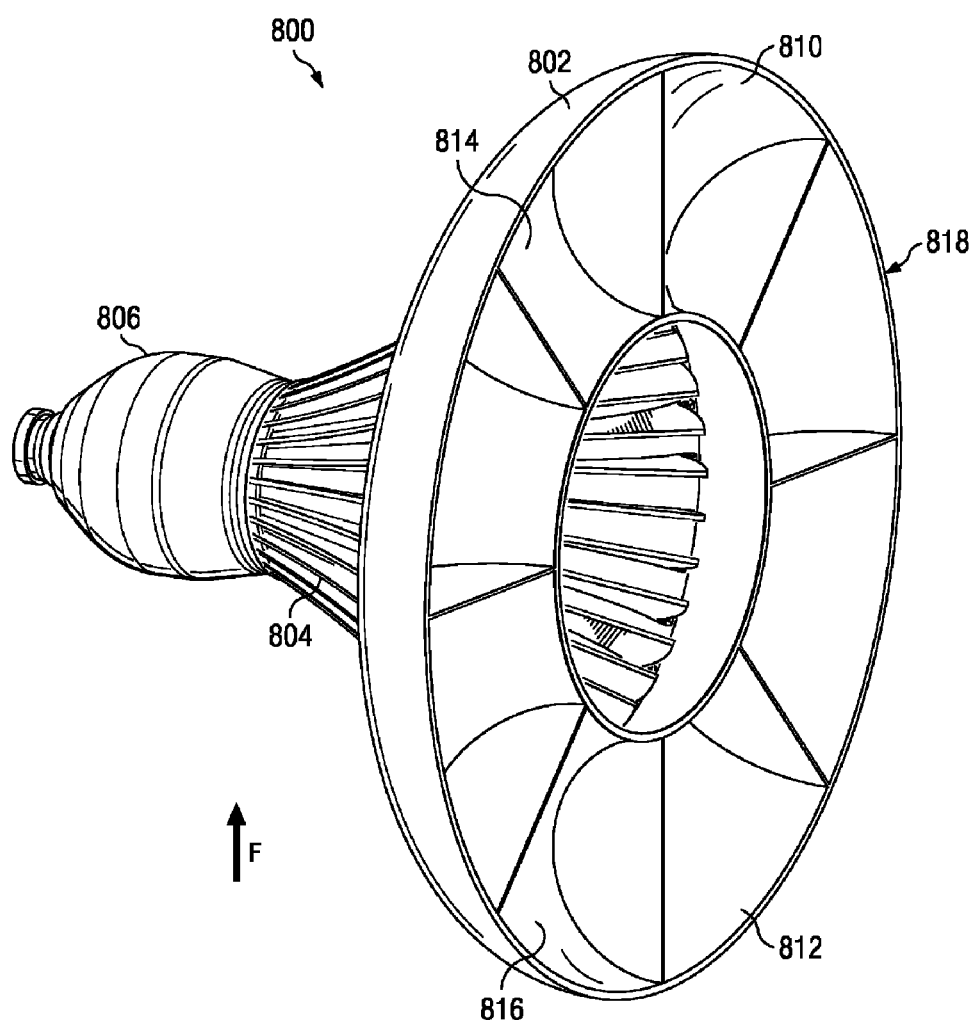
FIG. 8 is an illustration of a full toroid drogue canopy with a plurality of sections in accordance with an advantageous embodiment.

Next, in FIGS. 6, 7, and 8, illustrations of a drogue with a full toroid drogue canopy with different levels of inflation are depicted in accordance with an advantageous embodiment. In FIG. 6, an illustration of a full toroid drogue canopy inflated to a first level of inflation is depicted in accordance with an advantageous embodiment. A toroid is defined as a surface generated by a closed plane curve rotated about a line that lies in the same plane as the curve but does not intersect it. A toroid may be, for example, shaped like a doughnut. Drogue 600 is an example of one implementation of drogue 316 of FIG. 3. A "full" toroid is a toroid. A full toroid may have a shape similar to a doughnut. The surface of a "full" toroid is a full circle about an axis. A "half" toroid is half of the surface of a full toroid. The surface of a "half" toroid is a semicircle about an axis. The shape of a "half" toroid may be similar to the shape of the letter "C".

Drogue 600 may include coupling 606, vanes 604, and drogue canopy 602. Coupling 606 is an example of one implementation of coupling 324 of FIG. 3. Vanes 604 is an example of one implementation of vanes 320 in FIG. 3.

In this advantageous embodiment, drogue canopy 602 comprises an inflatable material. A rapid deflation mechanism will be used to deflate drogue canopy 602 when drogue canopy 602 is retracted into a stowage tube, such as stowage tube 352 of FIG. 3.

In this state, drogue 600 is configured to operate at higher speeds than drogue 700 of FIG. 7. Drogue canopy 602 is inflated to a first level of inflation to reduce the surface area of drogue canopy 602 and maintain a lower surface area than drogue canopy 702 of FIG. 7. The first level of inflation may be a halfway inflated drogue canopy. Also, the first level of inflation may be any level of inflation between fully deflated and fully inflated.

With reference to FIG. 7, an illustration of a full toroid drogue canopy inflated to a second level of inflation is depicted in accordance with an advantageous embodiment. In this advantageous embodiment, drogue 700 is an example of one implementation of drogue 316 of FIG. 3. Drogue 700 may include coupling 706, vanes 704, and drogue canopy 702. Coupling 706 is an example of one implementation of coupling 324 of FIG. 3. Vanes 704 is an example of one implementation of vanes 320 in FIG. 3.

In this state, drogue 700 is configured to operate at lower speeds than drogue 600 of FIG. 6. Drogue canopy 702 is inflated to a second level of inflation to increase the surface area of drogue canopy 702 and maintain a higher surface area than drogue canopy 602 of FIG. 6. The second level of inflation may be a fully inflated drogue canopy. Also, the second level of inflation may be any level of inflation between fully deflated and fully inflated.

With reference to FIG. 8, an illustration of a full toroid drogue canopy with a plurality of sections is depicted in accordance with an advantageous embodiment. In this advantageous embodiment, drogue 800 is an example of one implementation of drogue 316 of FIG. 3. Drogue 800 may include coupling 806, vanes 804, and drogue canopy 802. Coupling 806 is an example of one implementation of coupling 324 of FIG. 3. Vanes 804 is an example of one implementation of vanes 320 in FIG. 3.

In this advantageous embodiment, drogue canopy 802 is compartmentalized into plurality of sections 818, such as section 810, 812, 814, and 816. Each section 810, 812, 814, and 816 can to be inflated and/or modified independently. During a refueling operation, different sections may be modified and/or inflated with different surface areas allowing drogue 800 to be steered in different directions. For example, if section 810 and 814 are modified to have a more surface area than section 812 and 816, then the result would be more drag for section 810 and 814 than section 812 and 816. When section 810 and section 814 have more drag than section 812 and section 816, drogue 800 would move in an upward direction as indicated by the force arrow labeled (F).

Through this process, drogue 800 may move in any direction. The precision of the movement is limited by the number of plurality of sections 818 in drogue canopy 802. For example, the more plurality of sections 818 that exist, the more directions drogue 800 can be steered. A guidance system may be used to steer drogue 800, such as guidance system 220 of FIG. 2. Guidance system 220 of FIG. 2 may be automatic or may be manually controlled. If manually controlled, guidance system 220 of FIG. 2 may be controlled by an operator from tanker aircraft 301 and/or receiver aircraft 348 of FIG. 3.

Figure 9:
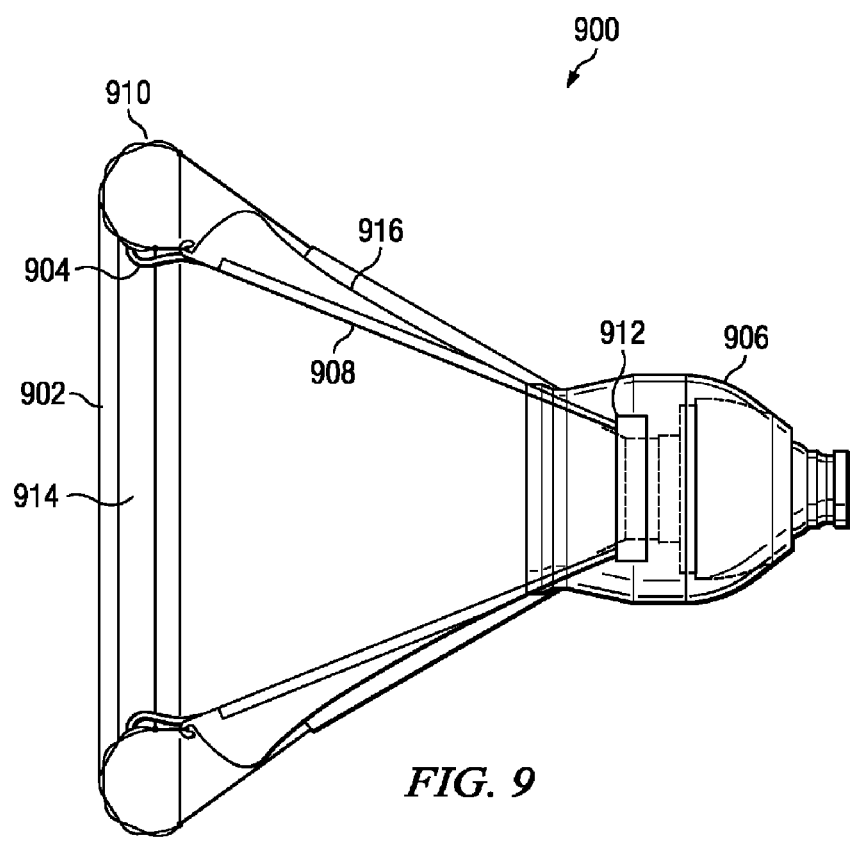
FIG. 9 is an illustration of a half toroid drogue canopy inflated to a first level of inflation in accordance with an advantageous embodiment.
Figure 10:
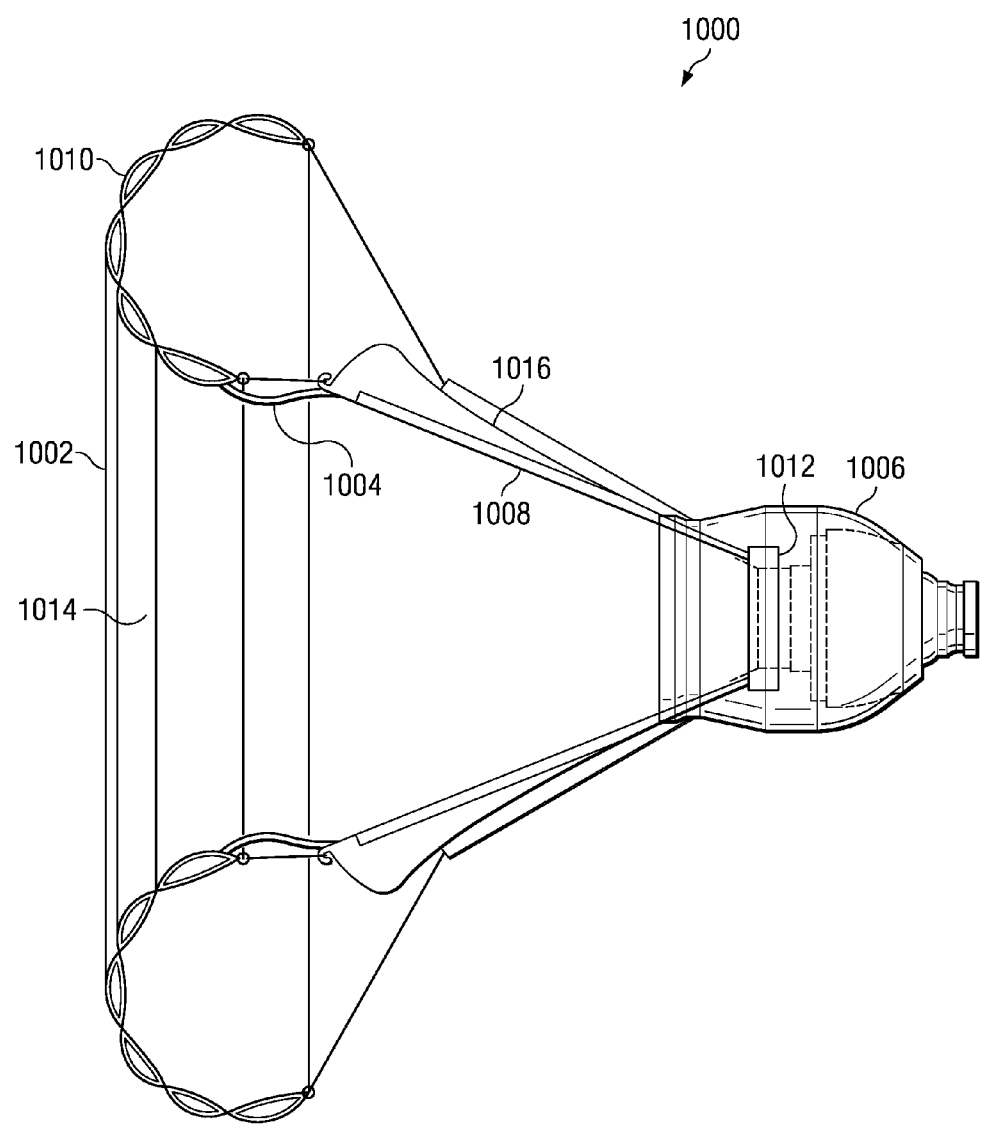
FIG. 10 is an illustration of a half toroid drogue canopy inflated to second level of inflation in accordance with an advantageous embodiment.
Figure 11:
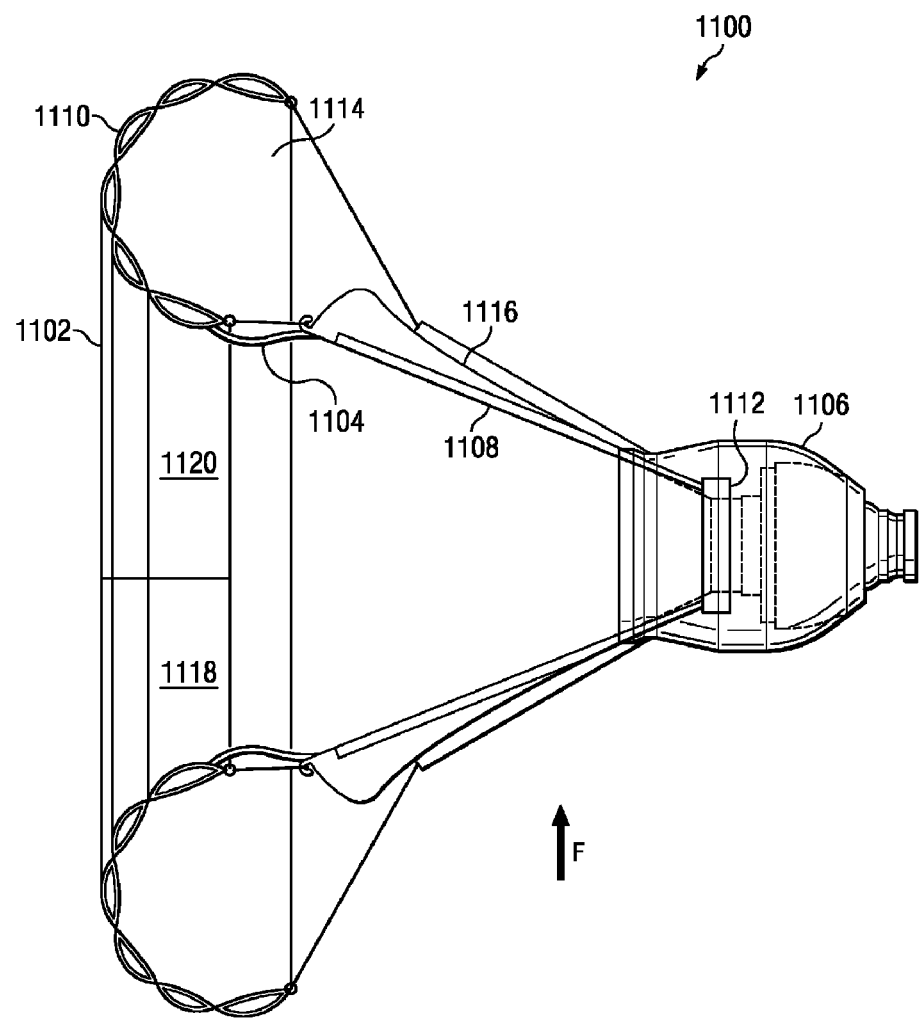
FIG. 11 is an illustration of a half toroid drogue canopy with a plurality of sections in accordance with an advantageous embodiment.

Next, in FIGS. 9, 10, and 11, illustrations of a drogue with a half toroid drogue canopy with different levels of inflation are depicted in accordance with an advantageous embodiment. FIG. 9 is an illustration of a half toroid drogue canopy inflated to a first level of inflation in accordance with an advantageous embodiment. Drogue 900 is an example of one implementation of drogue 316 of FIG. 3.

Drogue 900 may include coupling 906, fixed vanes 908, moveable vanes 916, inflation tube 904, and drogue canopy 902. Coupling 906 may be implemented as coupling 324 of FIG. 3. Drogue canopy 902 may be implemented as drogue canopy 318 in FIG. 3. Compressed air source 912 is just one type of air source that may be used in this illustrative embodiment. Compressed air source 912 fills drogue canopy 902 with air through inflation tube 904. Drogue canopy 902 comprises a material 914 which is inflatable. Drogue canopy 902 comprises chambers 910 molded around drogue canopy 902 which inflate incrementally. A rapid deflation mechanism will be used to deflate drogue canopy 902 when drogue canopy 902 is retracted into its stowage tube.

In this state, drogue 900 is configured to operate at higher speeds than drogue 1000 of FIG. 10. Drogue canopy 902 is inflated to a first level of inflation to reduce the surface area of drogue canopy 902 and maintain a lower surface area than drogue canopy 1002 of FIG. 10. The first level of inflation may be a halfway inflated drogue canopy. Also, the first level of inflation may be any level of inflation between fully deflated and fully inflated.

With reference to FIG. 10, an illustration of a half toroid drogue canopy inflated to second level of inflation is depicted in accordance with an advantageous embodiment. In this advantageous embodiment, drogue 1000 is an example of one implementation of drogue 316 of FIG. 3. Drogue 1000 may include coupling 1006, fixed vanes 1008, moveable vanes 1016, inflation tube 1004, and drogue canopy 1002. Coupling 1006 may be implemented as coupling 324 of FIG. 3. Drogue canopy 1002 may be implemented as drogue canopy 318 in FIG. 3. Compressed air source 1012 is just one type of air source that may be used in this illustrative embodiment. Compressed air source 1012 fills drogue canopy 1002 with air through inflation tube 1004. Drogue canopy 1002 comprises a material 1014 which is inflatable. Drogue canopy 1002 comprises chambers 1010 molded around drogue canopy 1002 which inflate incrementally. A rapid deflation mechanism will be used to deflate drogue canopy 1002 when drogue canopy 1002 is retracted into its stowage tube.

In this state, drogue 1000 is configured to operate at lower speeds than drogue 900 of FIG. 9. Drogue canopy 1002 is inflated to a second level of inflation to increase the surface area of drogue canopy 1002 and maintain a higher surface area than drogue canopy 902 of FIG. 9. The second level of inflation may be a fully inflated drogue canopy. Also, the second level of inflation may be any level of inflation between fully deflated and fully inflated.

With reference to FIG. 11, an illustration of a half toroid drogue canopy with a plurality of sections is depicted in accordance with an advantageous embodiment. In this advantageous embodiment, drogue 1100 is an example of one implementation of drogue 316 of FIG. 3. Drogue 1100 may include coupling 1106, fixed vanes 1108, moveable vanes 1116, inflation tube 1104, and drogue canopy 1102. Coupling 1106 may be implemented as coupling 324 of FIG. 3. Drogue canopy 1102 may be implemented as drogue canopy 318 in FIG. 3. Compressed air source 1112 is just one type of air source that may be used in this illustrative embodiment. Compressed air source 1112 fills drogue canopy 1102 with air through inflation tube 1104. Drogue canopy 1102 comprises a material 1114 which is inflatable. Drogue canopy 1102 comprises chambers 1110 molded around drogue canopy 1102 which inflate incrementally. A rapid deflation mechanism will be used to deflate drogue canopy 1102 when drogue canopy 1102 is retracted into its stowage tube.

In this advantageous embodiment, drogue canopy 1102 is compartmentalized into a plurality of sections, such as section 1120 and 1118. Each section 1120 and 1118 can to be inflated and/or modified independently.

During a refueling operation, different sections may be modified and/or inflated with different surface areas allowing drogue 1100 to be steered in different directions. For example, if section 1120 is modified to have a more surface area than section 1118, then the result would be more drag for section 1120 than section 1118. When section 1120 has more drag than section 1118, drogue 1100 would move in an upward direction as indicated by the force arrow labeled (F).

Through this process, drogue 1100 may move in any direction. The precision of the movement is limited by the number of plurality of sections in drogue canopy 1102. For example, the more plurality of sections that exist, the more directions drogue 1100 can be steered. A guidance system may be used to steer drogue 1100, such as guidance system 220 of FIG. 2. Guidance system 220 of FIG. 2 may be automatic or may be manually controlled. If manually controlled, guidance system 220 of FIG. 2 may be controlled by an operator from tanker aircraft 301 and/or receiver aircraft 348 of FIG. 3.

Figure 12:
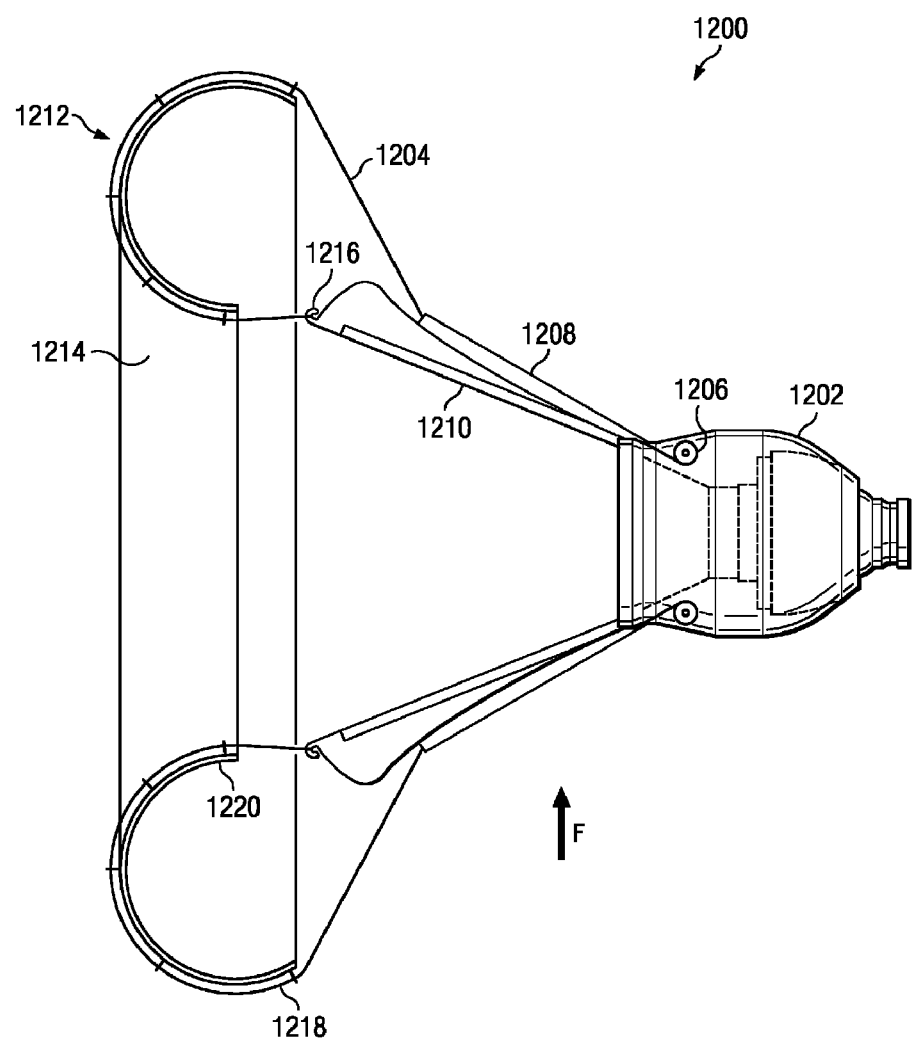
FIG. 12 is an illustration of a half toroid drogue canopy expanded to a first level of expansion in accordance with an advantageous embodiment.
Figure 13:
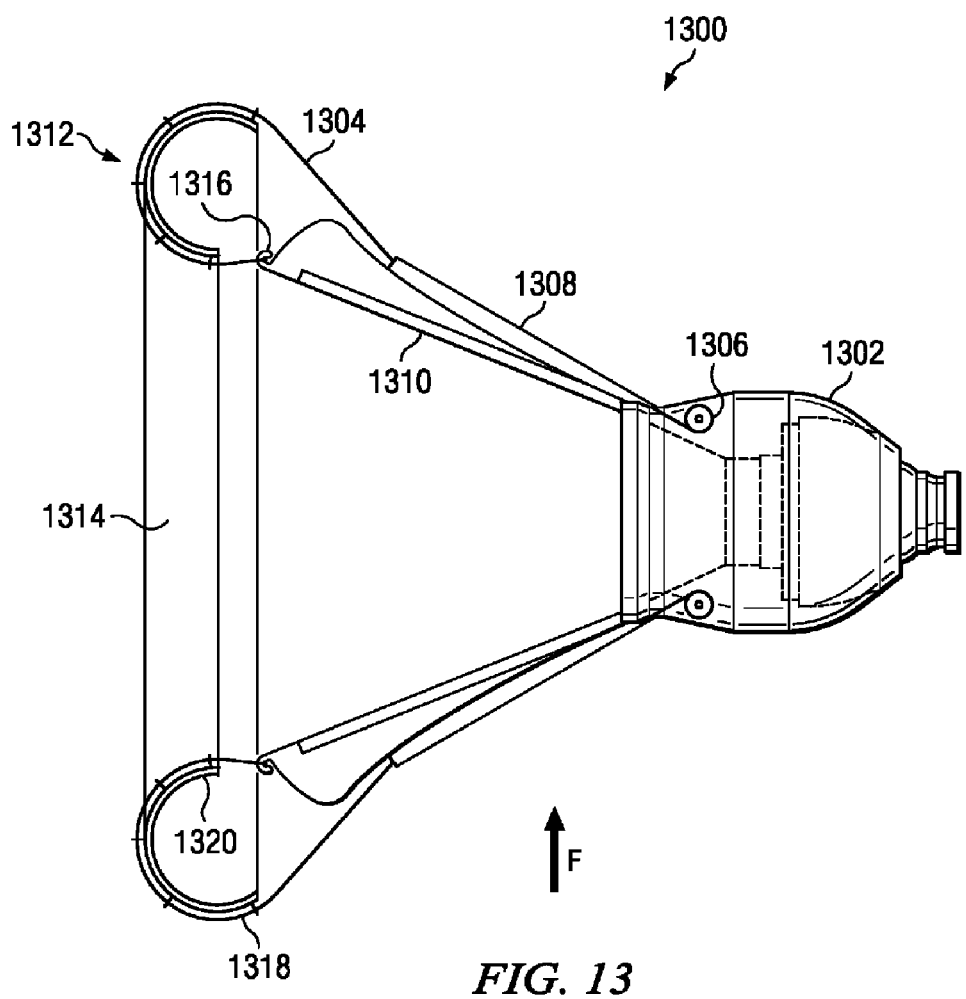
FIG. 13 is an illustration of a half toroid drogue canopy expanded to a second level of expansion in accordance with an advantageous embodiment.
Figure 14:
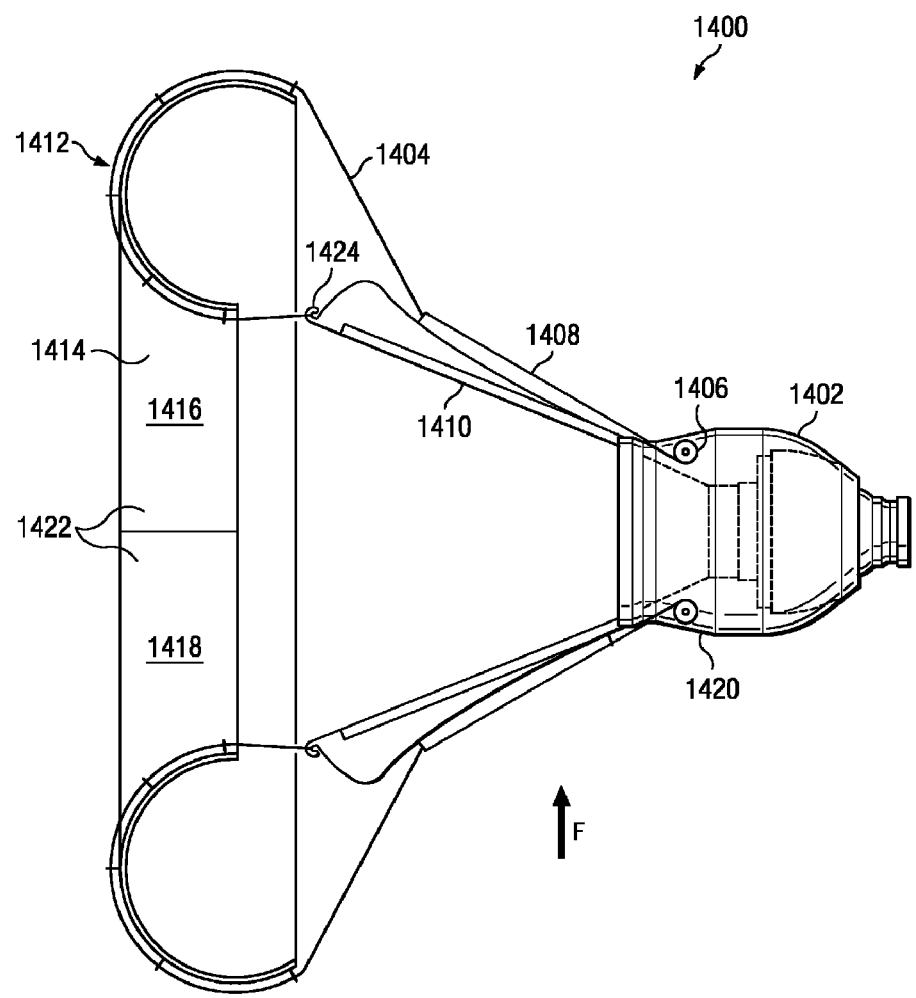
FIG. 14 is an illustration of a half toroid drogue canopy with a plurality of sections in accordance with an advantageous embodiment.

Next, in FIGS. 12, 13, and 14, illustrations of a drogue with a half toroid drogue canopy with different levels of expansion are depicted in accordance with an advantageous embodiment. In FIG. 12, an illustration of a half toroid drogue canopy expanded to a first level of expansion is depicted in accordance with an advantageous embodiment. In this advantageous embodiment, drogue 1200 is an example of one implementation of drogue 316 of FIG. 3.

In this advantageous embodiment, drogue 1200 comprises coupling 1202, suspension lines 1204, actuator 1206, moveable vanes 1208, fixed vanes 1210, and drogue canopy 1212. Coupling 1202 is an example of one implementation of coupling 324 of FIG. 3. Drogue canopy 1202 is an example of one implementation of drogue canopy 318 in FIG. 3. Drogue canopy 1212 comprises a material 1214 which is expandable. Fixed vanes 1210 are connected to coupling 1202 and innermost edge 1220 of drogue canopy 1212. Moveable vanes 1208 are connected to coupling 1202 and outermost edge 1218 of drogue canopy 1212.

Within coupling 1202 is actuator 1206. Actuator 1206 is a mechanical device for controlling suspension lines 1204. Actuator 1206 may be, for example, a rotary actuator, a linear actuator, or a track actuator. By controlling suspension lines 1204, drogue canopy 1212 may be expanded or retracted. Suspension lines 1204 are routed from the end of suspension lines 1204, which are nearest drogue canopy 1212 of the moveable vanes 1208 through eyelets 1216 attached at the end nearest drogue canopy 1212 of fixed vanes 1210 and further routed along the side of drogue canopy 1212 opposite coupling 1202 and further routed along moveable vanes 1208 to actuator 1206. Actuator 1206 is a type of drogue canopy controller, such as drogue canopy controller 330 of FIG. 3. Actuator 1206 operates to retract or extend suspension lines 1204, and thereby retracting or expanding drogue canopy 1212.

In this state, drogue 1200 is configured to operate at higher speeds than drogue 1300 of FIG. 13. Drogue canopy 1212 is inflated to a first level of inflation to reduce the surface area of drogue canopy 1214 and maintain a lower surface area than drogue canopy 1312 of FIG. 13. The first level of inflation may be a halfway inflated drogue canopy. Also, the first level of inflation may be any level of inflation between fully deflated and fully inflated.

With reference to FIG. 13, an illustration of a half toroid drogue canopy expanded to a second level of expansion is depicted in accordance with an advantageous embodiment. In this advantageous embodiment, drogue 1300 is an example of one implementation of drogue 316 of FIG. 3.

In this advantageous embodiment, drogue 1300 comprises coupling 1302, suspension lines 1304, actuator 1306, moveable vanes 1308, fixed vanes 1310, and drogue canopy 1312. Coupling 1302 is an example of one implementation of coupling 324 of FIG. 3. Drogue canopy 1312 is an example of one implementation of drogue canopy 318 in FIG. 3. Drogue canopy 1312 comprises a material 1314 which is expandable. Fixed vanes 1310 are connected to coupling 1302 and innermost edge 1320 of drogue canopy 1312. Moveable vanes 1308 are connected to coupling 1302 and outermost edge 1318 of drogue canopy 1312.

Within coupling 1302 is actuator 1306. Actuator 1306 is a mechanical device for controlling suspension lines 1304. Actuator 1306 may be, for example, a rotary actuator, a linear actuator, or a track actuator. By controlling suspension lines 1304, drogue canopy 1312 may be expanded or retracted. Suspension lines 1304 are routed from the end of suspension lines 1304, which are nearest drogue canopy 1312 of the moveable vanes 1308 through eyelets 1316 attached at the end nearest drogue canopy 1312 of fixed vanes 1310 and further routed along the side of drogue canopy 1312 opposite coupling 1302 and further routed along moveable vanes 1308 to actuator 1306. Actuator 1306 is a type of drogue canopy controller, such as drogue canopy controller 330 of FIG. 3. Actuator 1306 operates to retract or extend suspension lines 1304, and thereby retracting or expanding drogue canopy 1312.

In this state, drogue 1300 is configured to operate at lower speeds than drogue 1200 of FIG. 12. Drogue canopy 1314 is inflated to a second level of inflation to increase the surface area of drogue canopy 1314 and maintain a higher surface area than drogue canopy 1214 of FIG. 12. The second level of inflation may be a fully inflated drogue canopy. Also, the second level of inflation may be any level of inflation between fully deflated and fully inflated.

With reference to FIG. 14, an illustration of a half toroid drogue canopy with a plurality of sections is depicted in accordance with an advantageous embodiment In this advantageous embodiment, drogue 1400 comprises coupling 1402, suspension lines 1404, actuator 1406, moveable vanes 1408, fixed vanes 1410, and drogue canopy 1412. Coupling 1402 is an example of one implementation of coupling 324 of FIG. 3. Drogue canopy 1402 is an example of one implementation of drogue canopy 318 in FIG. 3. Drogue canopy 1412 comprises a material 1414 which is expandable. Fixed vanes 1410 are connected to coupling 1402 and innermost edge 1420 of drogue canopy 1412. Moveable vanes 1408 are connected to coupling 1402 and drogue canopy 1412.

Within coupling 1402 is actuator 1406. Actuator 1406 is a mechanical device for controlling suspension lines 1404. Actuator 1406 may be, for example, a rotary actuator, a linear actuator, or a track actuator. By controlling suspension lines 1404, drogue canopy 1412 may be expanded or retracted. Suspension lines 1404 are routed from the end of suspension lines 1404, which are nearest drogue canopy 1412 of the moveable vanes 1408 through eyelets 1424 attached at the end nearest drogue canopy 1412 of fixed vanes 1410 and further routed along the side of drogue canopy 1412 opposite coupling 1402 and further routed along moveable vanes 1408 to actuator 1406. Actuator 1406 is a type of drogue canopy controller, such as drogue canopy controller 330 of FIG. 3. Actuator 1406 operates to retract or extend suspension lines 1404, and thereby retracting or expanding drogue canopy 1412.

In this advantageous embodiment, drogue canopy 1412 is separated into plurality of sections 1422, such as section 1416 and 1418. Each section 1416 and 1418 may be expanded independently. Section 1418 is modified by actuator 1406. Section 1416 is modified by actuator 1406.

During a refueling operation, different sections may be expanded to different surface areas allowing drogue 1400 to be steered in different directions. For example, if the section 1416 were expanded to have more surface area than section 1418 then the result would be more drag for section 1416 than section 1418. When section 1416 has more drag than section 1418, drogue 1400 would move in an upward direction as indicated by the force arrow labeled (F).

Through this process, drogue 1400 may move in any direction. The precision of the movement is limited by the number of plurality of sections 1422 in drogue canopy 1414. For example, the more plurality of sections 1422 that exist, the more directions drogue 1400 can be steered. A guidance system may be used to steer drogue 1400, such as guidance system 220 of FIG. 2. Guidance system 220 of FIG. 2 may be automatic or may be manually controlled. If manually controlled, guidance system 220 of FIG. 2 may be controlled by an operator from tanker aircraft 301 and/or receiver aircraft 348 of FIG. 3.

Figure 15:
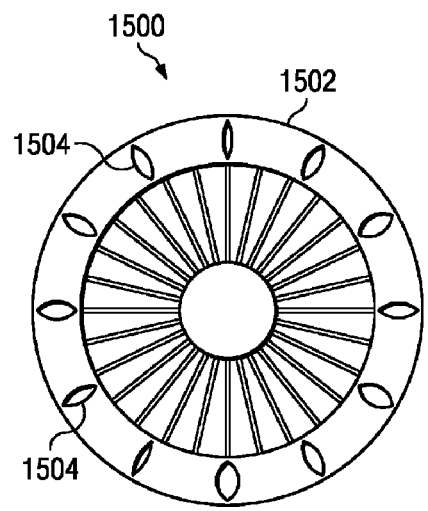
FIG. 15 is an illustration of a drogue with open slits in accordance with an advantageous embodiment.
Figure 16:
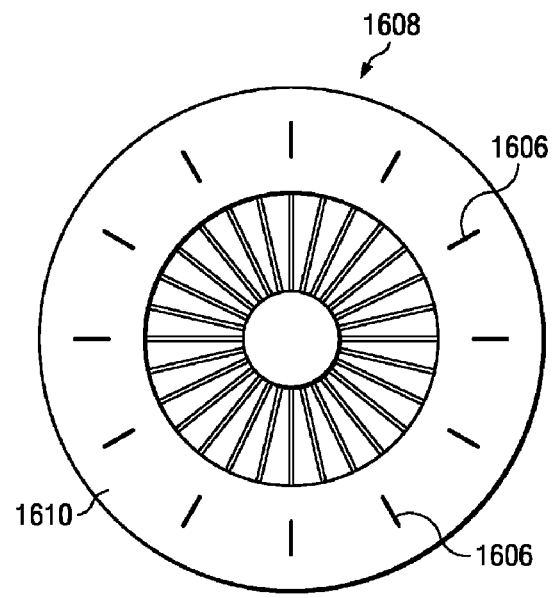
FIG. 16 is an illustration of a drogue with closed slits in accordance with an advantageous embodiment.

Turning now to FIGS. 15 and 16, an illustration of a drogue with slits is depicted in accordance with an advantageous embodiment. Drogue 1500 and/or drogue 1608 may be implemented as drogue 316 of FIG. 3. Drogue 1500 comprises drogue canopy 1502. Drogue canopy 1502 comprises slits 1504 in a slightly inflated version. Slits 1504 reduce drag because they are opening which allow air to travel through drogue canopy 1502. Drogue 1608 comprises drogue canopy 1610. Drogue canopy 1610 comprises slits 1606 in a highly inflated version. Slits 1606 increase drag because they are closed and do not allow air to travel through drogue canopy 1502.

The illustrations of drogues in FIGS. 6-17 are only examples of some implementations of drogue 314 in FIG. 3. These illustrations are not meant to limit the manner in which other advantageous embodiments can be implemented. For example, drogue 314 may be shaped in any manner. For example, without limitation, drogue 314 may be shaped in an oval, ellipse, and/or square.

Figure 17:
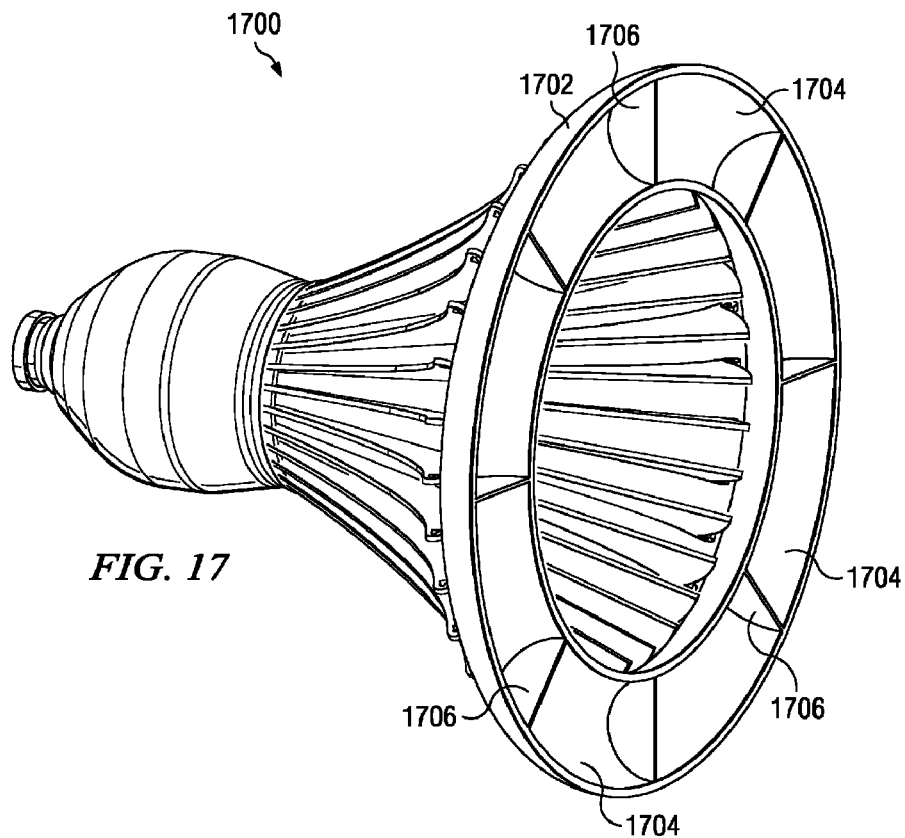
FIG. 17 is an illustration of a drogue canopy with a plurality of sections in accordance with an illustrative embodiment.

With reference now to FIG. 17, an illustration of a drogue canopy with a plurality of sections is depicted in accordance with an illustrative embodiment. Drogue canopy 1702 of drogue 1700 may be implemented as drogue canopy 318 of FIG. 3. Drogue canopy 1702 has a plurality of sections 1704. Each section of the plurality of sections 1704 may be separated by a wall, such as wall 1706. Wall 1706 may be made from the same material as drogue canopy 1702 and/or a different material. Wall 1706 separates two sections of the plurality of sections 1704. Separation allows each section of the plurality of sections 1704 to inflate separately.

Figure 18:
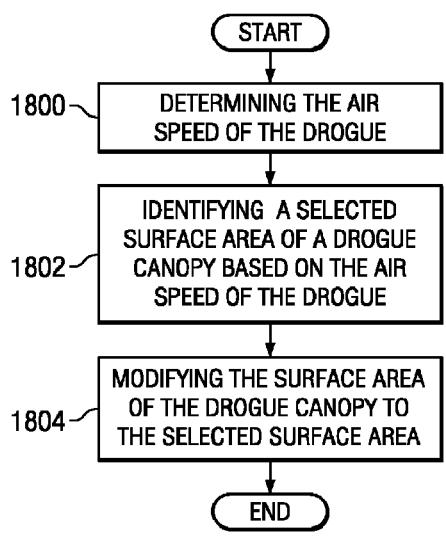
FIG. 18 is a flowchart of a process for modifying the surface area of a drogue canopy in conformance with an air speed of a drogue in accordance with an advantageous embodiment.

With reference now to FIG. 18, a flowchart of a process for modifying the surface area of a drogue canopy in conformance with an air speed of a drogue in accordance with an advantageous embodiment. This process may be implemented using refueling system 302 for aircraft 300 in FIG. 3.

The process begins by an air data sensor in a coupling of a drogue determining the air speed of the drogue (step 1800). The drogue comprises a drogue canopy. The drogue canopy may be made of a material which is either inflatable and/or elastic. If the drogue canopy is made from an inflatable material, the drogue canopy may be, but not limited to, the shape of a full toroid or a half toroid. If the drogue canopy is made from an elastic or expandable material, the drogue canopy may be, but not limited to, the shape of a half toroid.

An air data computer in the coupling of the drogue then identifies a selected surface area of a drogue canopy based on the air speed of the drogue (step 1802). The selected surface area allows for fuel hose positioning. The selected surface area is inversely related to the air speed. For example, the greater the airspeed, the lower the selected surface area. The selected surface area is identified to provide fuel hose positioning and/or fuel hose catenary. Fuel hose catenary positions the fuel hose and drogue below the airstream of the aircraft enough to minimize wake turbulence and is extended enough to allow safe separation between the aircraft and a receiver aircraft.

Then, a drogue canopy controller in the coupling of the drogue modifies a surface area of the drogue canopy to the selected surface area (step 1804). Modifying the surface area may comprise inflating or deflating an inflatable drogue canopy when the drogue canopy is made from an inflatable material. The drogue canopy may be inflated by using compressed air or ram air. Modifying the surface area may also comprise expanding or retracting when the drogue canopy is made from an elastic or expandable material. Expanding or retracting the drogue canopy may be done by a manipulation of suspension lines.

Additionally, in another illustrative embodiment, the air data computer identifies a projected frontal area of the drogue canopy based on the air speed the drogue. The air data computer may identify the selected surface area and the projected frontal area separately or together. The projected frontal area may be controlled and/or modified by the drogue canopy controller. The identified projected frontal area may determine a selected surface area and vice versa an identified selected surface area may determine a projected frontal area.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, different components of on-board portion 304 of FIG. 3 may instead be on deployable portion 312 of FIG. 3, or vice versa. As another example, drogue canopy 318 of FIG. 3 may be combined with vanes 320 of FIG. 3 to form one component.

In one advantageous embodiment, a refueling system on an aircraft comprises a fuel hose coupled to the aircraft, a drogue coupled to the fuel hose, an air data computer, and a drogue canopy controller coupled to the drogue canopy. The drogue further comprises a coupling, a plurality of vanes, and a drogue canopy. The drogue canopy controller determines a selected surface area of the drogue canopy based on air speed. The drogue canopy controller is configured to modify a surface area of the drogue canopy to conform to the selected surface area.

Additionally, it is understood that using an inflatable material does not preclude and may specifically include the material also be expandable and vice versa, if the material is expandable, it may also be inflatable. In some advantageous embodiments, a inflatable material, expandable material, or an inflatable and expandable material may be used in either a full toroid and/or half toroid drogue canopy.

One or more of the different advantageous embodiments provide a drogue that can be used over a broad range of speeds during refueling. This capability allows for improved operational readiness and interoperability. This improvement may come from avoiding a need to incur the time required to land and change drogues.

At least one of the different advantageous embodiments provide a broad speed range drogue that will provide for allowing a tanker aircraft to be compatible with more receiving aircraft when in a single mission when the receiving aircraft varies as to speed.

One or more of the different advantageous embodiments provide a broad speed range drogue that will provide for more efficient military applications, thus reducing operation and support costs for the military.

The description of the different advantageous embodiments has been presented for the purpose of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Although the different advantageous embodiments have been described with respect to parts for aircraft, other advantageous embodiments may be applied to parts for other types of platforms. For example, without limitation, other advantageous embodiments may be applied to a mobile platform or a stationary platform.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a drogue structure;
   a drogue canopy attached to the drogue structure, wherein the drogue canopy has a surface area;
   a compressed air source and at least one air delivery tube connected to the compressed air source and associated with at least one independent inflatable section in the drogue canopy; and
   a drogue canopy controller connected to the drogue canopy, wherein the drogue canopy is compartmentalized into a number of independent inflatable sections and wherein the drogue canopy controller is capable of independently changing the surface area of the drogue canopy by independently inflating the at least one independent inflatable section via the compressed air source and the at least one air delivery tube to steer the drogue structure in at least two or more different directions.

2. The apparatus of claim 1 further comprising:
   a coupling connected to the drogue structure, wherein the coupling connects the drogue structure to a fuel hose.

3. The apparatus of claim 1, wherein the drogue structure, the drogue canopy, and the drogue canopy controller form a drogue.

4. The apparatus of claim 3 further comprising:
a tanker aircraft, wherein the drogue is connected to the tanker aircraft by a fuel hose.

5. The apparatus of claim 3, wherein modifying the surface area of the drogue canopy changes a number of aerodynamic characteristics of the drogue.

6. The apparatus of claim 1, wherein the drogue structure comprises a plurality of vanes.

7. A drogue, comprising:
a coupling, wherein the coupling attaches the drogue to a fuel hose;
a plurality of vanes, wherein the plurality of vanes are attached to the coupling;
a drogue canopy, wherein the drogue canopy is attached to the plurality of vanes; and
a drogue canopy controller, wherein the drogue canopy controller is configured to modify a surface area of the drogue canopy, wherein the drogue canopy is compartmentalized into a number of independent inflatable sections and the drogue canopy controller is configured to change the surface area of the drogue canopy by inflating at least one independent inflatable section via a compressed air source and at least one air delivery tube to steer the drogue in at least two or more different directions.

8. The drogue of claim 7, wherein the drogue canopy is made of a material selected from a group consisting of an inflatable material, an elastic material, and an inflatable-elastic material.

9. The drogue of claim 7, wherein the drogue canopy is in a shape selected from a group consisting of a half toroid and a full toroid.

10. The drogue of claim 7, wherein the plurality of vanes comprise a plurality of fixed vanes and a plurality of moveable vanes, wherein the plurality of fixed vanes are connected to the coupling and connected to an innermost edge of the drogue canopy, and wherein the plurality of movable vanes are connected to the coupling and connected to an outermost edge of the drogue canopy.

11. The drogue of claim 7, wherein the drogue canopy comprises a plurality of sections, wherein the surface area of each section of the plurality of sections is independently modified.

12. The drogue of claim 7, further comprising:
a plurality of slits, wherein the plurality of slits reside throughout the drogue canopy, and wherein the plurality of slits decrease in size as the surface area of the drogue canopy increases.

13. A refueling system on an aircraft, comprising:
a fuel hose coupled to the aircraft;
a drogue coupled to the fuel hose, wherein the drogue comprises a coupling, a plurality of vanes, and a drogue canopy, wherein the drogue canopy is compartmentalized into a number of independent inflatable sections;
a compressed air source and at least one air delivery tube connected to the compressed air source and associated with at least one independent inflatable section in the drogue canopy;
an air data computer, wherein an air data computer determines a selected surface area of the drogue canopy based on air speed; and
a drogue canopy controller coupled to the drogue canopy, wherein the drogue canopy controller is configured to modify a surface area of the drogue canopy to conform to the selected surface area and wherein the drogue canopy controller is capable of independently changing the surface area of the drogue canopy by independently inflating the at least one independent section via the compressed air source and the at least one air delivery tube to steer the drogue in at least two or more different directions.

14. The refueling system of claim 13, wherein the drogue canopy is made of an inflatable material.

15. The refueling system of claim 14, wherein the compressed air source comprises an air compressor, wherein the air compressor inflates the drogue canopy to conform to the selected surface area.

16. The refueling system of claim 14, wherein the drogue canopy controller is a ram air intake, wherein the ram air intake inflates the drogue canopy to conform to the selected surface area.

17. The refueling system of claim 13, wherein the drogue canopy is made of an elastic material.

18. The refueling system of claim 13, wherein the air data computer increases the selected surface area of the drogue canopy in response to a first air speed and decreases the surface area of the drogue canopy in response to a second air speed, wherein the first air speed is lower than the second air speed.

19. The refueling system of claim 13, wherein the air data computer identifies the selected surface area of the drogue canopy to allow fuel hose positioning.

20. The refueling system of claim 19, wherein fuel hose positioning is below an airstream of the aircraft enough to minimize wake turbulence and extended enough to allow safe separation between the aircraft and a receiver aircraft.

21. The refueling system of claim 13, wherein the drogue canopy comprises a plurality of slits, wherein each of the plurality of slits size is inversely related to the surface area of the drogue canopy.

22. The refueling system of claim 13, wherein the drogue canopy comprises a plurality of sections.

23. The refueling system of claim 13, wherein the drogue canopy is in a shape of a half toroid.

24. The refueling system of claim 13, wherein the drogue canopy is in a shape of a full toroid.

25. A method for fuel hose positioning, the method comprising:
determining an air speed of a drogue;
identifying a selected surface area of a drogue canopy based on the air speed of the drogue, wherein the selected surface area allows fuel hose positioning; and
modifying the surface area of the drogue canopy to the selected surface area, wherein a drogue canopy controller is capable of independently changing a selected surface area of the drogue canopy by independently inflating at least one independent inflatable section via a compressed air source and at least one air delivery tube to steer the drogue in at least two or more different directions.

26. The method of claim 25, wherein modifying the surface area is performed by a drogue canopy controller.

27. The method of claim 25, wherein the selected surface area is inversely related to the air speed.

28. The method of claim 25, wherein modifying the surface area comprises inflating the drogue canopy.

29. The method of claim 28, wherein inflating the drogue canopy is performed by using a drogue canopy controller selected from a group consisting of a compressed air mechanism and a ram air mechanism.

30. The method of claim 25, wherein modifying the surface area comprises deflating the drogue canopy.

31. The method of claim 25, wherein the drogue canopy is a shape selected from a group consisting of a full toroid and a half toroid.

32. The method of claim 25, wherein modifying the surface area comprises increasing the surface area of the drogue canopy.

33. The method of claim 25, wherein modifying the surface area comprises reducing the surface area of the drogue canopy.

34. The method of claim 25, wherein modifying the surface area comprises modifying a section of the surface area of the drogue canopy, and wherein modifying the section of the surface area of the drogue canopy allows steering of the drogue.

35. The method of claim 25, wherein fuel hose positioning is below the airstream of the aircraft enough to minimize wake turbulence and extended enough to allow safe separation between an aircraft and a receiver aircraft.

* * * * *